(12) United States Patent
Mirsky et al.

(10) Patent No.: US 8,774,600 B2
(45) Date of Patent: Jul. 8, 2014

(54) SPLICING SYSTEM

(75) Inventors: Yair Mirsky, Jerusalem (IL); Ariel Zentner, Allon (IL); Yael Weinbach, Jerusalem (IL); Len Sundy, Ramat Beit Shemesh (IL)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 13/259,013

(22) PCT Filed: May 17, 2010

(86) PCT No.: PCT/IB2010/052165
§ 371 (c)(1),
(2), (4) Date: Dec. 1, 2011

(87) PCT Pub. No.: WO2011/067683
PCT Pub. Date: Jun. 9, 2011

(65) Prior Publication Data
US 2012/0230652 A1  Sep. 13, 2012

(30) Foreign Application Priority Data
Dec. 2, 2009 (GB) .................................. 0921092.3

(51) Int. Cl.
*H04N 9/80* (2006.01)
*H04N 21/222* (2011.01)
*H04N 21/433* (2011.01)
*H04N 21/81* (2011.01)
*H04N 21/44* (2011.01)
*H04N 21/8547* (2011.01)

(52) U.S. Cl.
CPC ....... *H04N 21/2221* (2013.01); *H04N 21/4331* (2013.01); *H04N 21/812* (2013.01); *H04N 21/44016* (2013.01); *H04N 21/8547* (2013.01)
USPC ............ 386/250; 386/249; 386/248; 725/36; 725/42

(58) Field of Classification Search
USPC ................................... 386/249–250
See application file for complete search history.

(56) References Cited

U.S. PATENT DOCUMENTS 5,859,660 A * 1/1999 Perkins et al. ................... 725/32
5,917,830 A * 6/1999 Chen et al. ..................... 370/487

(Continued)

FOREIGN PATENT DOCUMENTS

| WO | WO 02/09425 A1 | 1/2002 |
| WO | WO 02/100110 A2 | 12/2002 |
| WO | WO 2007/102147 A2 | 9/2007 |

OTHER PUBLICATIONS

Aug. 5, 2010 Transmittal of International Search Report and Written Opinion of the International Searching Authority for the captioned application.

(Continued)

*Primary Examiner* — Helen Shibru
(74) *Attorney, Agent, or Firm* — Husch Blackwell LLP (57) ABSTRACT

A device including a module to receive a stream including an insertion content item and first timecodes, a module to record the stream, a module to receive a live stream including a timeslot and second and third timecodes, a clock to provide a clock reading updated based on at least some of the third timecodes, a module to retrieve the recorded stream so that the insertion content item can be at least partially rendered during at least part of the timeslot, a module to calculate a desired timecode of the first timecodes from which to start rendering the recorded stream for output at real-time speed based one of the first timecodes, second timecodes, and third timecodes or the clock reading, and a module to render the recorded stream for output at real-time speed from the desired timecode. Related apparatus and methods are also described.

16 Claims, 6 Drawing Sheets

(56) References Cited

U.S. PATENT DOCUMENTS

| | | | |
|---|---|---|---|
| 6,993,081 | B1 | 1/2006 | Brunheroto et al. |
| 7,725,202 | B2 * | 5/2010 | Chen et al. ............... 700/94 |
| 8,656,447 | B2 * | 2/2014 | Pasternak et al. ......... 725/146 |
| 2003/0149621 | A1 | 8/2003 | Shteyn |
| 2003/0149975 | A1 | 8/2003 | Eldering et al. |
| 2004/0244035 | A1 | 12/2004 | Wright et al. |
| 2005/0216932 | A1 | 9/2005 | Danker |
| 2005/0281328 | A1 * | 12/2005 | Hurst et al. ............... 375/240 |
| 2006/0031892 | A1 | 2/2006 | Cohen |
| 2006/0218602 | A1 | 9/2006 | Sherer et al. |
| 2008/0155581 | A1 * | 6/2008 | Leary ...................... 725/13 |
| 2008/0235087 | A1 | 9/2008 | Amento et al. |
| 2008/0282285 | A1 | 11/2008 | Thomas et al. |
| 2012/0099022 | A1 * | 4/2012 | Sundy et al. ............... 348/705 |

OTHER PUBLICATIONS

Feb. 15, 2010 Office Communication in connection with prosecution of GB 092 1092.3.
Sep. 25, 2013 Office Communication in connection with prosecution of AU 2010 325691.
May 15, 2013 Office Communication in connection with prosecution of AU 2010 335691.
Oct. 18, 2013 Office Communication in connection with prosecution of CN 2010 80015902.2.
Dec. 9, 2013 Office Communication in connection with prosecution of AU 2010 325691.

* cited by examiner

SPLICING SYSTEM

CROSS REFERENCE TO RELATED APPLICATIONS

The present application is a 35 USC §371 application of PCT/IB2010/052165, filed on May 17, 2010, and entitled "Splicing System", which was published on Jul. 9, 2011, in the English language with International Publication Number WO 2011/067683 and which claims priority of UK Patent Application GB 0921092.3 filed Dec. 2, 2009 the content of all of which is incorporated herein by reference.

FIELD OF THE INVENTION

The present invention relates to splicing of audio/video content in an end-user rendering device.

BACKGROUND OF THE INVENTION

The following references are believed to represent the state of the art:

US Published Patent Application 2003/0149621 of Shteyn;
US Published Patent Application 2003/0149975 of Eldering, et al.;
US Published Patent Application 2005/0216932 of Danker;
US Published Patent Application 2006/0031892 of Cohen;
US Published Patent Application 2006/0218602 of Sherer, et al.;
US Published Patent Application 2008/0235087 of Amento, et al.; and
US Published Patent Application 2008/0282285 of Thomas, et al.

SUMMARY OF THE INVENTION

The present invention, in certain embodiments thereof, seeks to provide an improved splicing system in an end-user rendering device.

There is thus provided in accordance with an embodiment of the present invention, an end-user rendering device including a plurality of operationally connected modules, including a first receiving module to receive a media stream from a first content server, the media stream including a first insertion content item and a plurality of first timecodes interspersed with the first insertion content item, a recording module to record the media stream in a storage device, a second receiving module to receive a live media stream from a second content server, the live media stream including a first channel of programming content having a timeslot and a plurality of second timecodes and third timecodes, the second and third timecodes being interspersed with the programming content and the timeslot, the timeslot being scheduled for a time after the first insertion content item has already been recorded in the storage device, a clock to provide a clock reading, the clock being operative to receive at least some of the third timecodes, the clock reading being updated based on the at least some third timecodes, a retrieving module to retrieve the recorded media stream from the storage device so that the first insertion content item can be at least partially rendered during at least part of the time allotted for the timeslot, a calculation element to calculate a desired timecode of the first timecodes from which to start rendering the recorded media stream for output at real-time speed based on a first timecode of the first timecodes, a second timecode of the second timecodes, and a third timecode of the third timecodes or the clock reading at the time of the calculation, and a rendering module to start rendering the recorded media stream for output at real-time speed from the desired timecode.

Further in accordance with an embodiment of the present invention the calculation element is operative to calculate the desired timecode such that, if the recorded media stream is rendered for output at real-time speed from the desired timecode, the end of the first insertion content item is viewed as coinciding with the end of the timeslot.

Still further in accordance with an embodiment of the present invention the live media stream also includes at least one live substitutable content item for rendering during the timeslot, the first insertion content item of the recorded media stream being a replacement content item for rendering instead of at least part of the at least one live substitutable content item, and the calculation element is operative to calculate the desired timecode such that, if the recorded media stream is rendered for output at real-time speed from the desired timecode, the at least one live substitutable content item is not outputted after the end of the replacement content item.

Additionally in accordance with an embodiment of the present invention the live substitutable content item is a live advertisement.

Moreover in accordance with an embodiment of the present invention the first and second timecodes are presentation time stamps, and the third timecodes are program clock references.

Further in accordance with an embodiment of the present invention the third timecode, used to calculate the desired timecode, is a most recent timecode of the third timecodes used to update the clock.

Still further in accordance with an embodiment of the present invention the first timecode is a timecode at the start of the first insertion content item in the recorded media stream, and the second timecode is a timecode at the start of the timeslot in the live media stream.

Additionally in accordance with an embodiment of the present invention the calculation element is operative to calculate the desired timecode such that the desired timecode is equal to the first timecode less the second timecode plus the third timecode, or the clock reading at the time of the calculation, the calculation being performed with all the inputs being adjusted to a same unit of time.

Moreover in accordance with an embodiment of the present invention the calculation element is operative to calculate the desired timecode such that the desired timecode is equal to the first timecode being a timecode at the start of the first insertion content item in the recorded media stream, less the second timecode being a timecode at the start of the timeslot in the live media stream, plus the third timecode being a most recent timecode of the third timecodes used to update the clock, or the clock reading at the time of the calculation, the calculation being performed with all the inputs being adjusted to a same unit of time.

Further in accordance with an embodiment of the present invention the recorded media steam includes at least one additional insertion content item prior to the first insertion content item, the at least one additional insertion content item being available for rendering in the timeslot with, and prior to, the first insertion content item, the at least one additional insertion content item having a duration, and the calculation element is operative to calculate the desired timecode such that the desired timecode is equal to the first timecode being a timecode at the start of the first insertion content item in the recorded media stream, less the second timecode being a timecode at the start of the timeslot in the live media stream, less the duration of the at least one additional insertion content item, plus the third timecode being a most recent timecode of the third timecodes used to update the clock, or the clock reading at the time of the calculation, the calculation being performed with all the inputs being adjusted to a same unit of time.

Still further in accordance with an embodiment of the present invention the at least one additional insertion content item is an at least one advertisement.

Additionally in accordance with an embodiment of the present invention selecting to view the first channel in the middle of the timeslot triggers the calculation element to calculate the desired timecode in the recorded media stream from which to start rendering the recorded media stream for output at real-time speed.

Moreover in accordance with an embodiment of the present invention the modules include another storage device for recording the live media stream, the rendering module being operative to render at least part of the live media stream recorded in the other storage device for output, after rendering from the storage device, the rendering module is operative to render at least part of the first insertion content item faster than real-time speed, and the calculation element is operative to calculate the desired timecode in the media stream from which to stop rendering the recorded media stream at faster than real-time speed and start rendering the recorded media stream for output at real-time speed.

Further in accordance with an embodiment of the present invention the timeslot is a commercial break timeslot, and the first insertion content item is a first advertisement.

There is also provided in accordance with still another embodiment of the present invention a method including receiving a media stream from a first content server, the media stream including a first insertion content item and a plurality of first timecodes interspersed with the first insertion content item, recording the media stream in a storage device, receiving a live media stream from a second content server, the live media stream including a first channel of programming content having a timeslot and a plurality of second and third timecodes, the second and third timecodes being interspersed with the programming content and the timeslot, the timeslot being scheduled for a time after the first insertion content item has already been recorded in the storage device, updating a clock based on the at least some third timecodes, retrieving the recorded media stream from the storage device so that the first insertion content item can be at least partially rendered during at least part of the time allotted for the timeslot, calculating a desired timecode of the first timecodes from which to start rendering the recorded media stream for output at real-time speed based on a first timecode of the first timecodes, a second timecode of the second timecodes, and a third timecode of the third timecodes or the clock reading at the time of the calculation, and rendering the recorded media stream for output at real-time speed from the desired timecode.

BRIEF DESCRIPTION OF THE DRAWINGS

The present invention will be understood and appreciated more fully from the following detailed description, taken in conjunction with the drawings in which.

DETAILED DESCRIPTION OF AN EMBODIMENT

Figure 1:
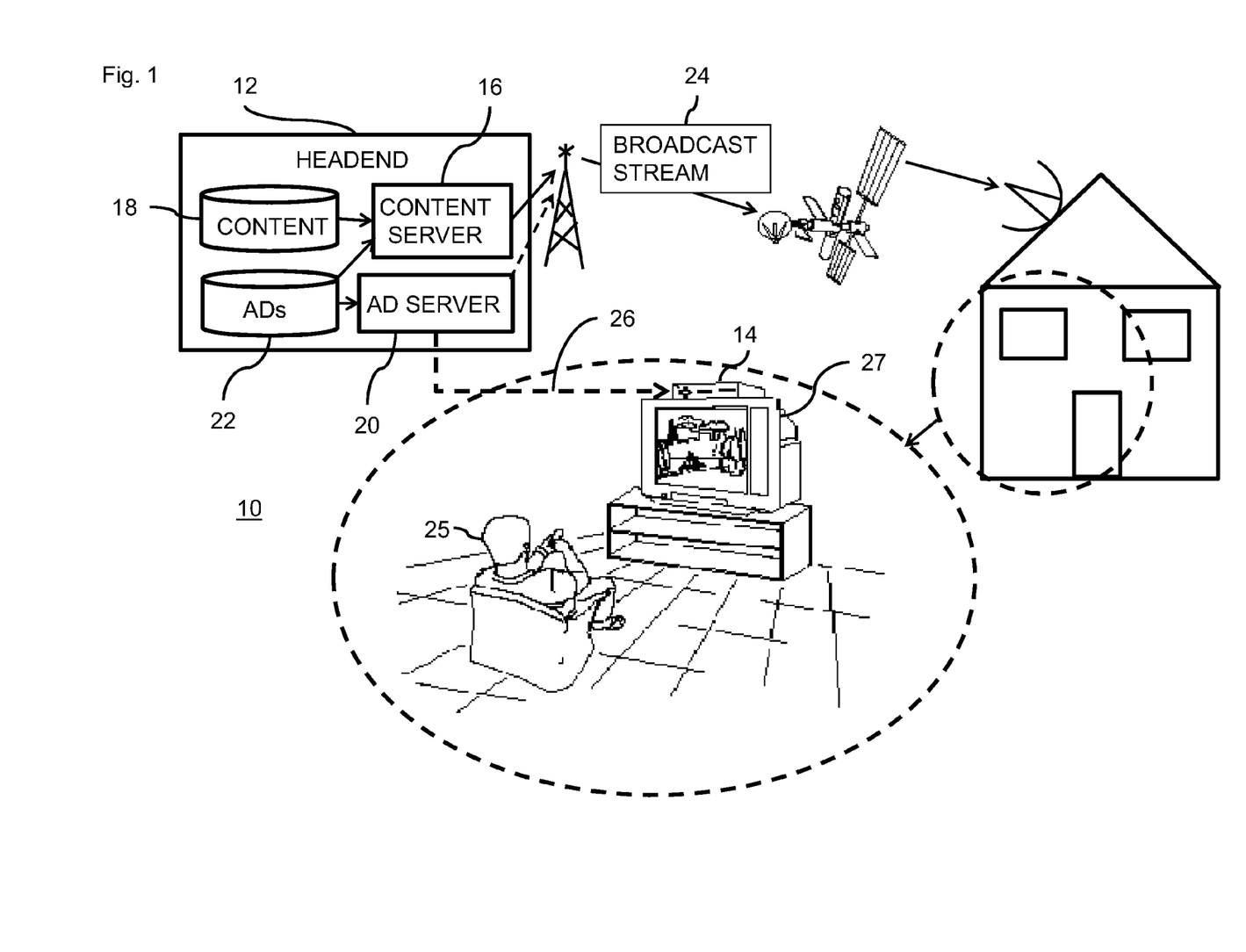
FIG. 1 is a partly pictorial, partly block diagram view of a broadcast system constructed and operative in accordance with an embodiment of the present invention.

Reference is now made to FIG. 1, which is a partly pictorial, partly block diagram view of a broadcast system 10 constructed and operative in accordance with an embodiment of the present invention.

The broadcast system 10 typically includes a Headend 12 for broadcasting content to a plurality of end-user rendering devices 14 (only one shown for clarity).

The Headend 12 typically includes: a content server 16; a content storage device 18 including content for broadcasting; an advertisement server 20 and an advertisement storage device 22 including advertisements.

The content server 16 generally retrieves content from the content storage device 18 and advertisements from the advertisement storage device 22 in order to prepare live content with live commercial breaks for broadcasting to the end-user rendering devices 14. FIG. 1 shows that the live content and live advertisements are broadcast in a broadcast stream 24 via satellite communication. It will be appreciate by those ordinarily skilled in the art that the broadcast stream 24 may be transmitted via any suitable communication system, for example, but not limited to, satellite, cable, terrestrial, Internet Protocol, and cellular telephone network or any suitable combination thereof.

The advertisement server 20 typically retrieves advertisements from the advertisement storage device 22 in order to prepare substitute or replacement advertisements for transmitting to the end-user rendering devices 14. The substitute advertisements may be used in the end-user rendering devices 14 to replace the live advertisements of the live commercial break.

The advertisement server 20 may deliver all the replacement advertisements to all the end-user rendering devices 14. Alternatively, the advertisement server 20 may target particular end-user rendering devices 14 with particular advertisements. The advertisement server 20 may also transmit rules, algorithms and/or instructions as to which replacement advertisements should be used and in what circumstances.

The replacement advertisements may be transmitted in the broadcast stream 24 or via any suitable communication channel, such as over an Internet Protocol Network 26.

The content server 16 and advertisement server 20 may be separate servers or a combined server. The content server 16 and the advertisement server 20 may be located at the same location or at separate locations. The data from each server 16, 20 may be transmitted to the end-user rendering devices 14 by the same communication system or via separate communication systems.

The content and the advertisements are rendered for consumption by a viewer 25 on an output device 27 such as on a display device (e.g.: a television or a screen and projector arrangement, a mobile device including a mobile telephone or PDA) and/or audio output device (e.g.: a stereo system, a mobile device including a mobile telephone or PDA by way of example only).

The term "rendered", in all grammatical forms, as used in the specification and claims, is defined herein to include preparing a media stream for outputting by the output device 27.

The term "output", in all grammatical forms, as used in the specification and claims, is defined herein to include outputting media content to the output device 27 in audio format and/or video format.

Figure 2:
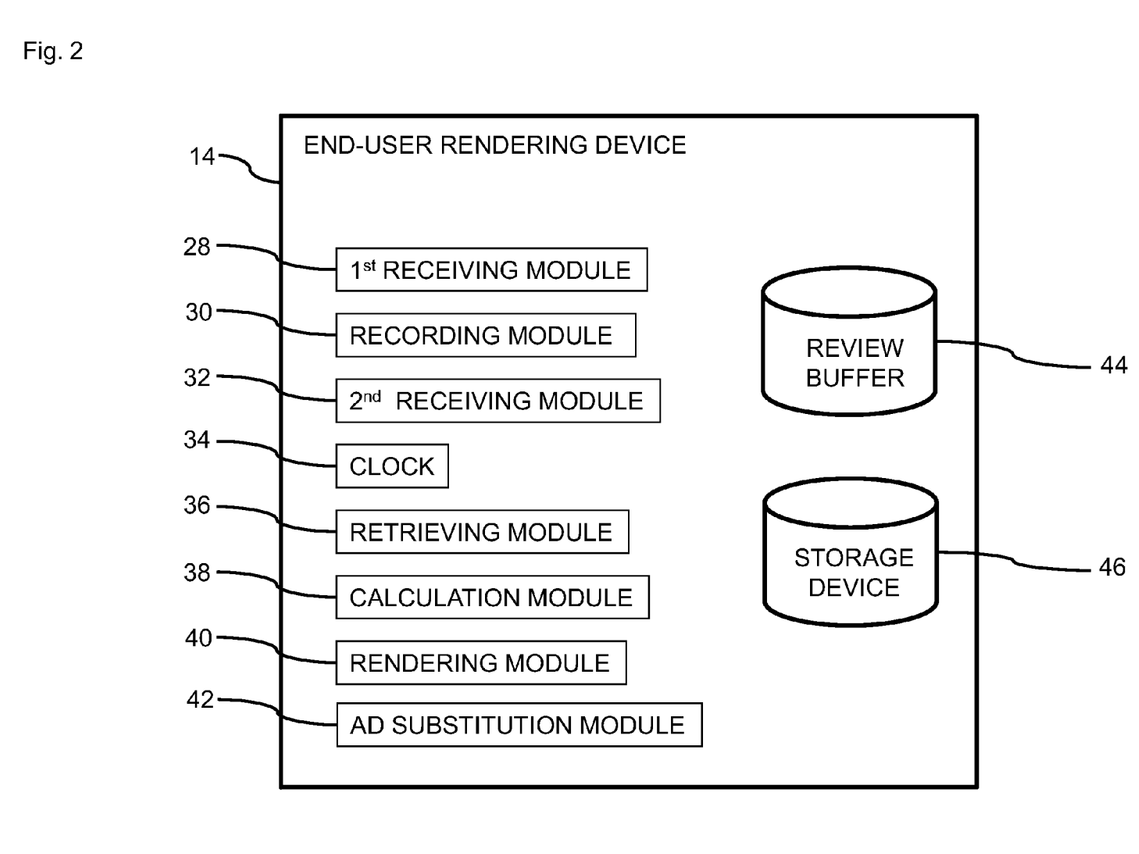
FIG. 2 is a block diagram view of an end-user rendering device in the system of FIG. 1.

Reference is now made to FIG. 2, which is a block diagram view of one of the end-user rendering devices 14 in the system 10 of FIG. 1.

The end-user rendering device 14 typically includes a plurality of operationally connected modules, including: a receiving module 28, a recording module 30, another receiving module 32, a clock 34, a retrieving module 36, a calculation module 38, a rendering module 40, an advertisement substitution module 42, a review buffer 44 and a storage device 46. The receiving modules 28, 32 may be combined into a single module or may be separate modules.

The modules of the end-user rendering device 14 are described in more detail with reference to FIGS. 3-6.

The end-user rendering device 14 may be any suitable device for storing and rendering content, for example, but not limited to, a set-top box or a receiver-decoder device, a personal video recorder, a digital video recorder, a suitably configured television, a suitably configured computer system, a mobile device such as a mobile telephone, television or PDA.

Figure 3:
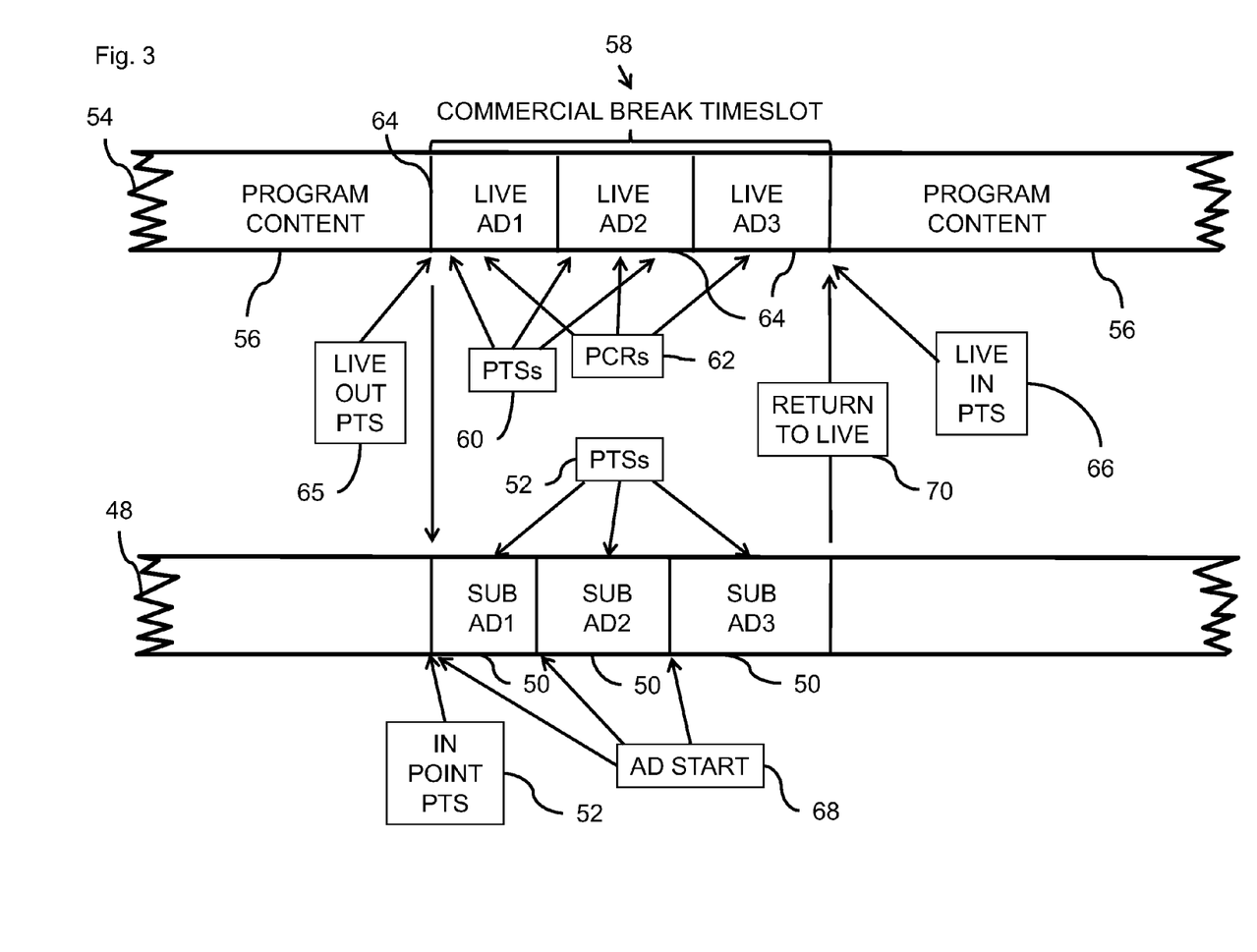
FIG. 3 is a partly pictorial, partly block diagram view showing advertisement substitution in the system of FIG. 1.

Reference is now made to FIG. 3, which is a partly pictorial, partly block diagram view showing advertisement substitution in the system 10 of FIG. 1. Reference is also made to FIG. 2.

The receiving module 28 is operative to receive a media stream 48 from the advertisement server 20. The media stream 48 typically includes one or more advertisements 50 and a plurality of timecodes 52 interspersed with the advertisements 50. The timecodes 52 are typically presentation time stamps (PTSs). Only three advertisements 50 are shown for the sake of clarity. The media stream 48 may include more than three advertisements 50.

The recording module 30 is operative to record the media stream 48 in the storage device 46. The advertisements 50 may be sent from the Headend 12 in different media streams 48 at different times and may be recorded in different video sequences or files in the storage device 46. Even if the advertisements 50 are sent consecutively, the advertisements 50 may be stored in the storage device 46 in separate video sequences.

The receiving module 32 is generally operative to receive a live media stream 54 from the content server 16. The live media stream 54 typically includes audio and/or video data as well as supporting metadata.

The live media stream 54 typically includes a first channel of programming content 56 having a commercial break timeslot 58 and a plurality of timecodes 60 and another plurality of timecodes 62. The timecodes 60, 62 are interspersed with the programming content 56 and the commercial break timeslot 58.

The timecodes 60 are typically presentation time stamps (PTSs) or any other suitable timecodes present in the live media stream 54.

The timecodes 62 are typically program clock references (PCRs) or any other suitable timecodes which are used to synchronize the Headend clock (not shown) and the clock 34 of the end-user rendering device 14.

The commercial break timeslot 58 is scheduled for a time after the advertisements 50 of the media stream 48 have already been recorded in the storage device 46.

The live media stream 54 also typically includes one or more live advertisements 64 for rendering during the commercial break timeslot 58.

The advertisements 50 of the recorded media stream 48 are potential replacement advertisements for rendering instead of the live advertisement 64 of the commercial break timeslot 58. During advertisement replacement, typically all of the live advertisements 64 of the commercial break timeslot 58 are replaced by the advertisements 50 of the media stream 48. However, it will be appreciated by those ordinarily skilled in the art that one or more of the live advertisements 64 may be replaced by one or more of the advertisements 50 of the media stream 48.

In accordance with an alternative embodiment of the present invention the live media stream 54 does not include any live advertisements for rendering during the commercial break timeslot 58 as advertisements rendered to viewers 25 (FIG. 1) are entirely sourced from the advertisements 50 received in the media stream 48.

The clock 34 is operative to provide a clock reading. The clock reading is typically used to control when each frame of video and/or audio is presented for display and/or output. The clock is operative to receive at least some of the timecodes 62 (typically being PCRs). The clock reading is updated based on the received timecodes 62. The clock reading may be updated based on each timecode 62 received by the clock 34 or only based on some of the timecodes 62 received by the clock. During playback of recorded media, the clock 34 may be adjusted or driven by the timecodes 52 (typically PTSs) of the recorded media alone, without input from the timecodes 62 (typically PCRs) of the live media stream 54, as will be described in more detail with reference to FIG. 6.

The live media stream 54 typically includes an out-splice point 65 and an in-splice point 66 signaling the start and end of the commercial break timeslot 58, respectively, in order to enable splicing the live media stream 54 with the advertisements 50 of the media stream 48. The live media stream 54 may include an out-splice point and an in-splice point for each of the live advertisements 64 so that each of the live advertisements 64 could be replaced on an individual basis if required.

The advertisement server 20 typically sends, to the end-user rendering device 14, information relating to a plurality of start points 68 (in terms of the timecodes 52, typically PTSs) signaling the start of each of the advertisements 50, as well as the duration of each of the advertisements 50.

While the viewer 25 (FIG. 1) is viewing the programming content 56 of the live media stream 54, the media stream 48 is typically retrieved from the storage device 46 by the retrieving module 36 some time before the out-splice point 65. The retrieving module 36 may be signaled to retrieve the media stream 48 by signals included in the broadcast stream 24, by way of example only.

When the clock reading is equal to the out-splice point 65 the advertisements 50 of the media stream 48 are outputted to the output device 27 (FIG. 1) instead of the live advertisements 64 of the live media stream 54. At the in-splice point 66 output to the output device 27 returns to the live programming content 56 (block 70). The selected advertisements 50 may be disposed in the same media stream 48 or in different media streams 48.

The decision of which of the advertisements 50 to provide as substitute advertisements is typically performed by the advertisement substitution module 42 in conjunction with information sent from the advertisement server 20.

Figure 4:
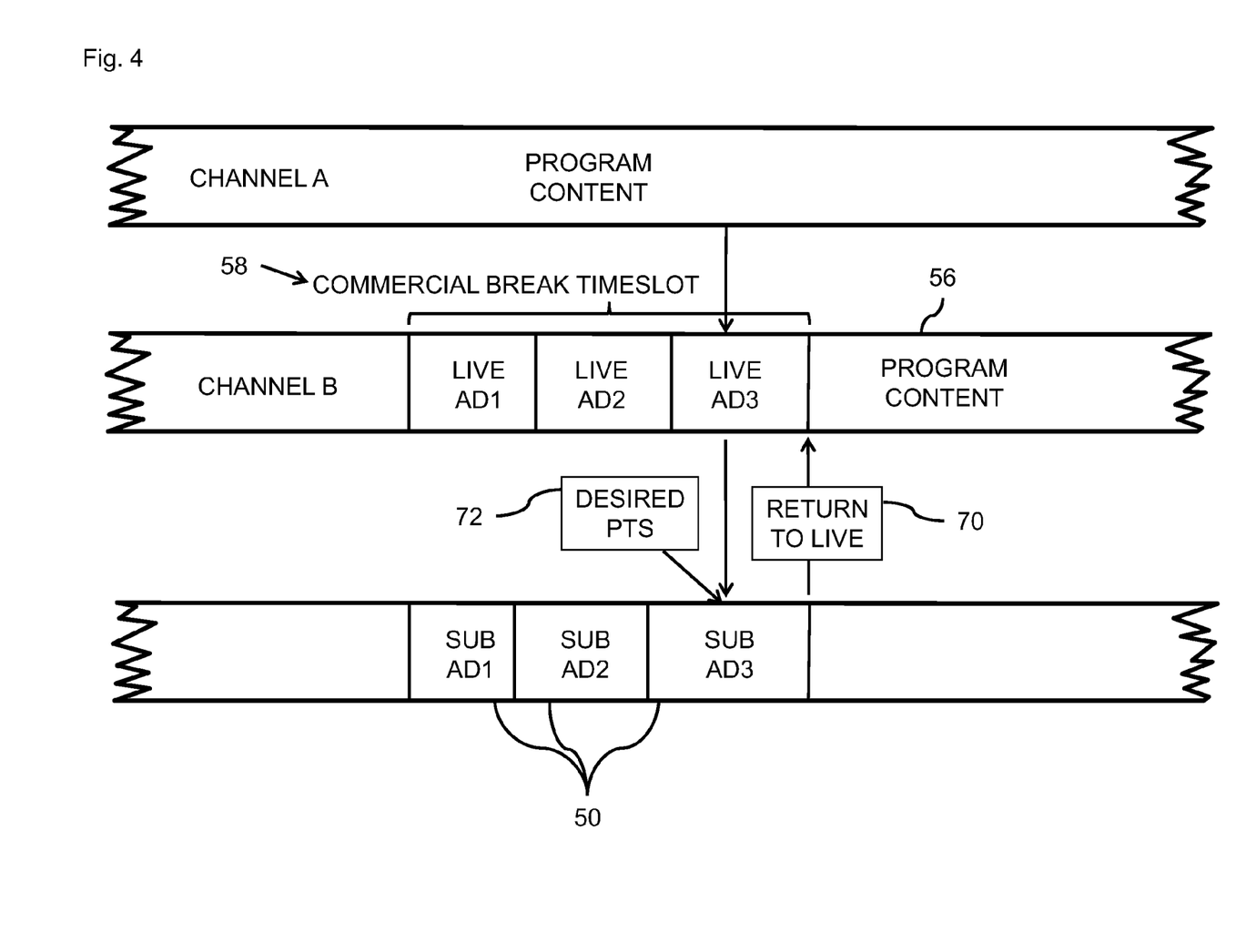
FIG. 4 is a partly pictorial, partly block diagram view showing advertisement substitution after changing a channel in the system of FIG. 1.

Reference is now made to FIG. 4, which is a partly pictorial, partly block diagram view showing advertisement substitution after changing channel in the system 10 of FIG. 1.

If the viewer 25 (FIG. 1) is viewing Channel A and then decides to zap (change channels) to Channel B at a time when Channel B is in the midst of the commercial break timeslot 58, the rendering module 40 (FIG. 2) cannot simply start rendering the replacement advertisements 50 from the start of the advertisements 50, as if the advertisements 50 are rendered at real-time speed from the start of the advertisements 50, the advertisements 50 will finish rendering after the time allotted for the commercial break timeslot 58 has already expired. The viewer 25 will then miss part of the live programming content 56 scheduled for after the commercial break timeslot 58.

Therefore, when the viewer 25 selects to view Channel B in the middle of the commercial break timeslot 58, the selection triggers the calculation module 38 (FIG. 2) to calculate a desired timecode 72 in the recorded media stream 48 from which to start rendering the recorded media stream 48 for display/output at real-time speed so that the return to live (block 70) coincides with the end of the commercial break timeslot 58. The calculation of the desired timecode 72 is described in more detail with reference to FIG. 6.

Other ways that Channel B may be selected in the middle of the commercial break timeslot 58, necessitating calculation of the desired timecode 72, include when the viewer 25 (FIG. 1) turns on the end-user rendering device 14, exits from an electronic program guide (EPG) or another interactive application and automatically arrives at Channel B, by way of example only.

Another application of the system 10, including calculation of the desired timecode 72, is during review buffer playback, as will now be described below.

Figure 5:
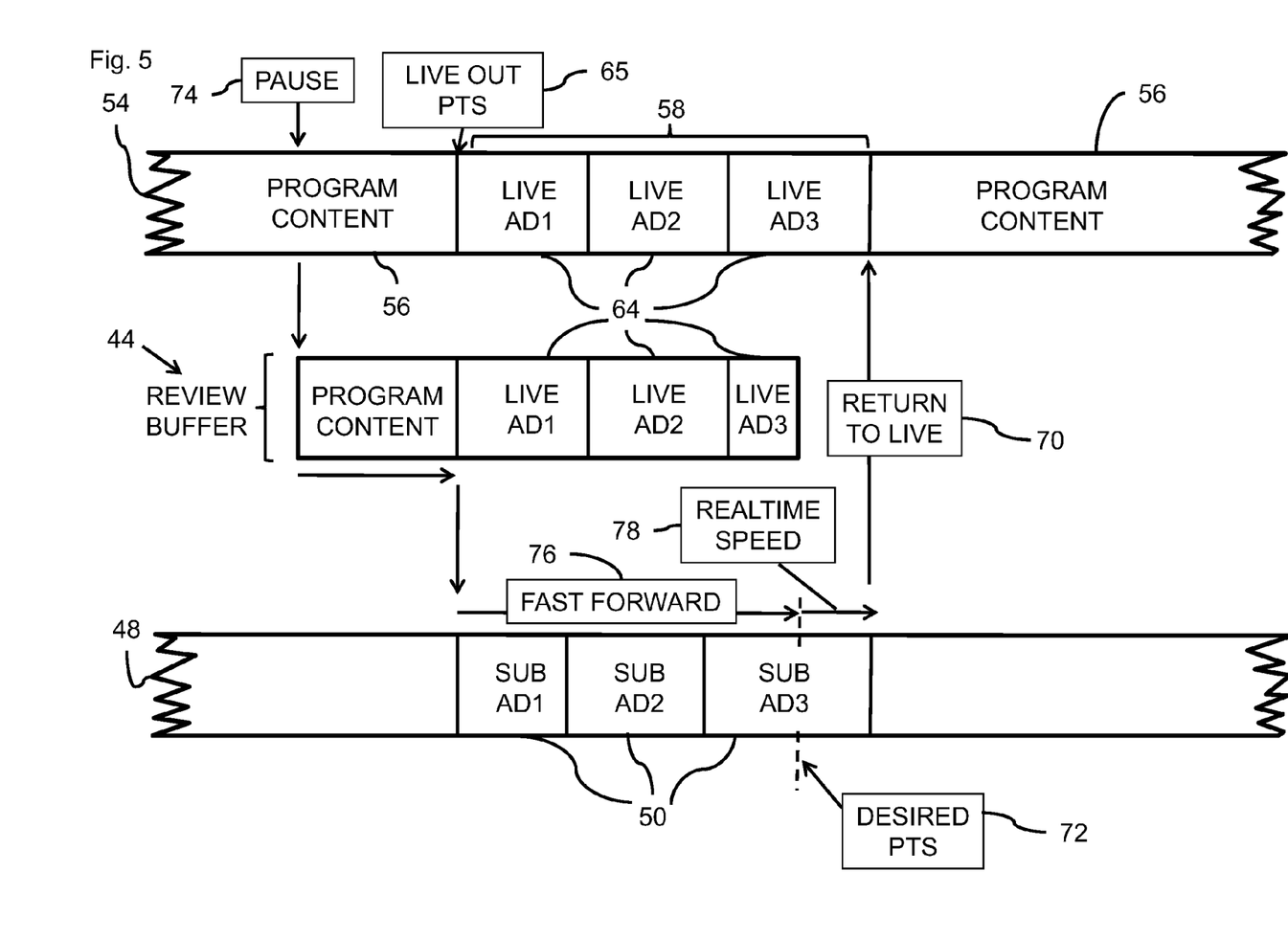
FIG. 5 is a partly pictorial, partly block diagram view showing advertisement substitution during review buffer playback in the system of FIG. 1.

Reference is now made to FIG. 5, which is a partly pictorial, partly block diagram view showing advertisement substitution during review buffer playback in the system 10 of FIG. 1. Reference is also made to FIG. 2.

The use of the review buffer 44 without replacing the live advertisements 64 is first described.

By way of introduction, the viewer 25 (FIG. 1) may have the option to employ trick-modes or trick play, for example, but not limited to, pause, replay, fast-forward, and rewind of recorded/buffered live content. For example, the viewer 25 may pause (block 74) the live programming content 56. While the live programming content 56 of the live media stream 54 is paused, the live programming content 56 of the live media stream 54 is recorded in a storage device such as the review buffer 44. Some time later, the viewer 25 may decide to resume playing of the "live", now recorded, programming content 56 stored in the review buffer 44. When the commercial break timeslot 58 is reached while playing back from the review buffer 44, the viewer 25 may decide to fast forward through the "live", now recorded, advertisements 64 in order to catch up with the live broadcast of the live media stream 54.

If the user catches up with the live broadcast of the live media stream 54 in the middle of the commercial break timeslot 58, the fast forward will stop, as the end of the review buffer 44 has been reached, and the live advertisements 64 will be played from the live broadcast stream 54 at real-time speed.

The use of the review buffer 44 while replacing the live advertisements 64 with the replacement advertisements 50 is now described.

The viewer 25 may pause the live programming content 56. While the live programming content 56 is paused, the live programming content 56 is recorded to a storage device such as the review buffer 44. Some time later the viewer 25 may decide to resume playing of the "live", now recorded, programming content 56 which is recorded in the review buffer 44 triggering the rendering module 40 to render at least part of the live media stream 54 recorded in the review buffer 44 for display/output.

Prior to the viewer 25 reaching the commercial break timeslot 58, the retrieving module 36 is signaled that advertisement substitution should take place in the commercial break timeslot 58. The retrieving module 36 then retrieves the media stream 48 from the storage device 46.

When the beginning of the commercial break timeslot 58 is reached while playing back from the review buffer 44, the rendering module 40 is signaled by the out-splice point 65 to replace the "live", now recorded, live advertisements 64 with the replacement advertisements 50. The rendering module 40 then renders the advertisements 50 of the media stream 48 for outputting to the output device 27 (FIG. 1) instead of the "live", now buffered, advertisements 64 of the "live", now buffered, media stream 54. The viewer 25 may decide to fast forward (block 76) through the advertisements 50 in order to catch up with the live broadcast of the live media stream 54. Therefore, after rendering from the review buffer 44, the rendering module 40 is operative to render at least part of the advertisements 50 faster than real-time speed.

While fast-forwarding through the advertisements 50, the user could, if allowed to, reach the end of the advertisements 50 too soon such that a generally undesirable situation occurs whereby the user catches up with the live broadcast of the live media stream 54 in the middle of the commercial break timeslot 58, and the live advertisements 64 will be played from the live broadcast stream 54 at real-time speed.

Therefore, the end-user rendering device 14 is operative to prevent the viewer from fast-forwarding through the advertisements 50 to such an extent that the replacement advertisements 50 are rendered for output/display beyond an equivalent point which would currently be rendered in the live advertisements 64. Therefore, when the rendering of the advertisements 50 reaches the equivalent point, the advertisements 50 are rendered for display/output at real-time speed (block 78) so that the end of the rendering of the advertisements 50 coincides with the end of the commercial break timeslot 58 on return to live (block 70).

Therefore, the calculation module is operative to calculate the desired timecode 72 in the media stream 48 from which to stop rendering the recorded media stream 48 at faster than real-time speed and start rendering the recorded media stream 48 for display/output at real-time speed.

The calculation of the desired timecode 72 is described in more detail with reference to FIG. 6.

Figure 6:
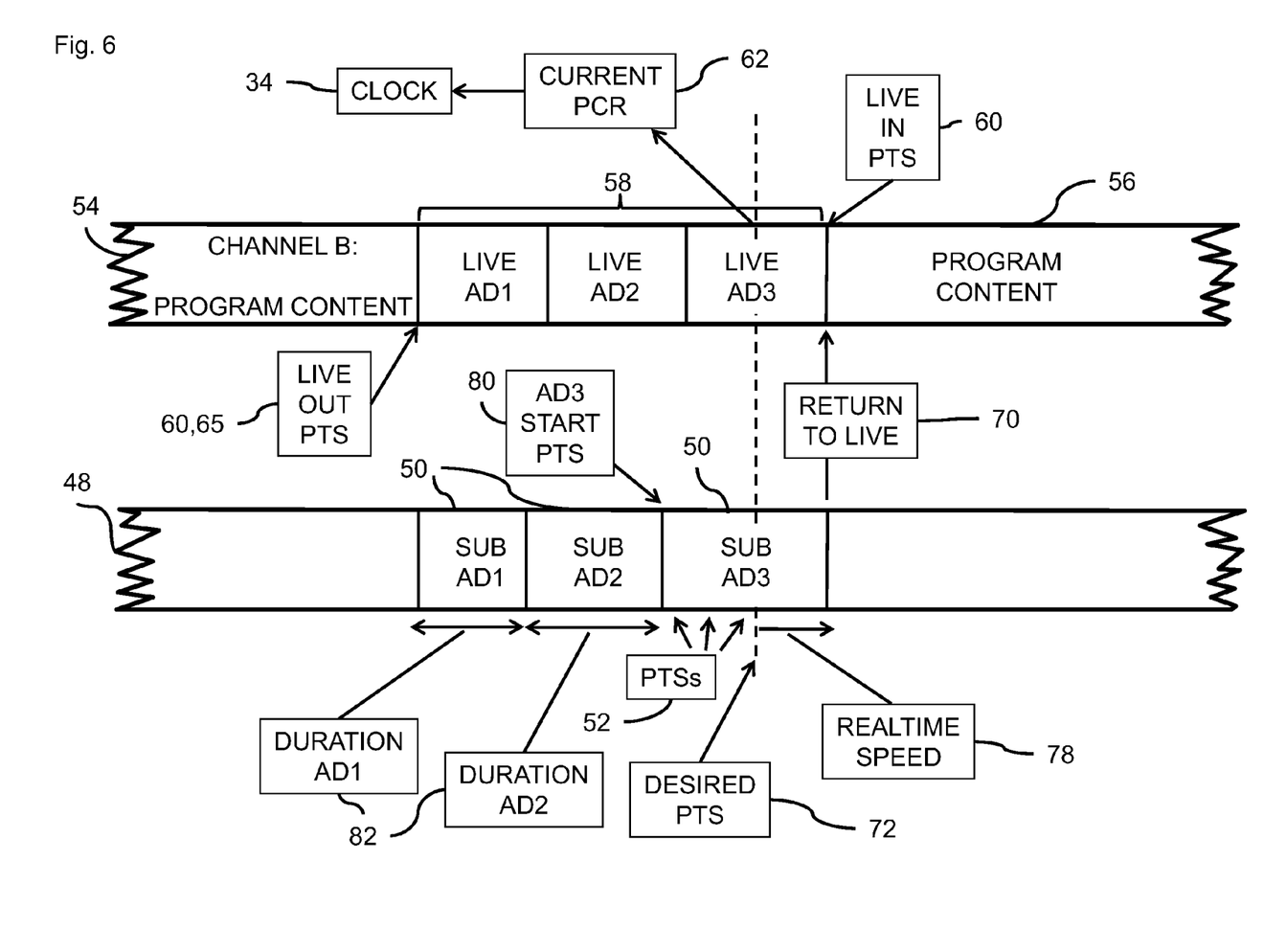
FIG. 6 is a partly pictorial, partly block diagram view showing calculation of a desired timecode in the system of FIG. 1.

Reference is now made to FIG. 6, which is a partly pictorial, partly block diagram view showing calculation of the desired timecode 72 in the system 10 of FIG. 1. Reference is also made to FIG. 2.

The following description assumes that the desired timecode 72 is in SUB AD3 of the advertisements 50 of the media stream 48.

Prior to advertisement substitution the retrieving module 36 is operative to retrieve the recorded media stream 48 from the storage device so that SUB AD3 can be at least partially rendered during at least part of the time allotted for the commercial break timeslot 58.

The calculation module 38 is operative to calculate the desired timecode 72 of the timecodes 52 from which to start rendering the recorded media stream 48 for display/output at real-time speed such that, if the recorded media stream 48 is rendered for display/output at real-time speed from the desired timecode 72, the end of SUB AD3 is viewed as coinciding with the end of the commercial break timeslot 58 and none of the live advertisements 64 are displayed/outputted after the end of SUB AD3. Additionally, typically none of the programming content 56 of the live media stream 54 after the end of the commercial break timeslot 58 is missed.

In general, the calculation module 38 is operative to calculate the desired timecode 72 from which to start rendering the recorded media stream 48 for display/output at real-time speed based on: a timecode of the timecodes 52 (typically PTSs); a timecode of the timecodes 60 (typically PTSs); and a timecode of the timecodes 62 (typically PCRs) or the clock reading at the time of the calculation.

In accordance with an embodiment of the present invention, the calculation module 38 is operative to calculate the desired timecode 72 such that the desired timecode 72 is equal to:

a timecode 80 at the start of SUB AD3 in the recorded media stream 48; less a timecode at the start of the commercial break timeslot 58 in the live media stream 54 (the out-splice point 65); less the duration 82 of SUB AD 1 and SUB AD2 (and any other substitute advertisements for rendering during the commercial break timeslot 58); plus the "live time" which is typically given by a most recent timecode of the timecodes 62 used to update the clock 34 or the clock reading at the time of the calculation.

The calculation is performed with all the inputs being adjusted to the same unit of time. So for example, the PCR driven times may be given in 27 MHZ time units, whereas the PTS timestamps may be given in 90 KHZ time units. Therefore, the PCR times can be divided by 300 to be in the same unit of time as the PTSs. Also the calculations assume that modular arithmetic is used, so for example, if all values are in PTS units (e.g.: 90 KHz) modular arithmetic of modulo 90,000 is used.

If there is only one substitute advertisement 50 in the commercial break timeslot 58, or the desired timecode 72 is in SUB AD1 (the first substitute advertisement of the commercial break timeslot 58) then the above calculation is performed without the duration of previous substitute advertisements 50.

It will be appreciated by those ordinarily skilled in the art that if all of the live advertisements 64 of the commercial break timeslot 58 are not being substituted, then the start of the commercial break timeslot 58 could be considered to be the out-splice point of the live advertisements 64 which are being substituted for the purposes of the calculation of the desired timecode 72.

In accordance with an alternative embodiment of the present invention, the desired timecode 72 may be determined based on timecodes at the end of the commercial break timeslot 58 and the end of SUB AD3 as well as the "live time". Other combinations may be possible based on different combinations of timecodes from the live media stream 54 and the recorded media stream 48 and the "live time".

When changing channels to Channel B in the middle of the commercial break timeslot 58, or exiting an EPG or interactive application and arriving in the middle of the commercial break timeslot 58, the desired timecode 72 is determined by the calculation module 38 upon selecting, or arriving at, Channel B.

However, when the advertisements 50 are being fast-forwarded after the review buffer 44 playback as described with reference to FIG. 5, the calculation may need to be performed by the calculation module 38 periodically or every time the clock is updated by one of the timecodes 62.

The rendering module 40 is operative to start rendering the recorded media stream 48 for display/output at real-time speed from the desired timecode 72. The term "start rendering the recorded media stream 48 for display/output at real-time speed from the desired timecode 72", in all grammatical forms, as used in the specification and claims, is defined herein to also include changing the speed of rendering of the recorded media stream 48 from faster than real-time speed to real-time speed at the desired timecode 72.

In accordance with an alternative embodiment of the present invention, the calculation module 38 determines how the clock 34 should be adjusted so that the clock reading is equal to the desired timecode 72 updated continually by the live time which is driven by the timecodes 62 (typically PCRs). The calculation module 38 determines the adjustment to be equal to:

the timecode 80 at the start of SUB AD3 in the recorded media stream 48; less the timecode 65 at the start of the commercial break timeslot 58 in the live media stream 54; less the duration 82 of SUB AD1 and SUB AD2 (and any other substitute advertisements 50 for rendering during the commercial break timeslot 58). The clock 34 is then adjusted using the above adjustment so that the clock reading is equal to the "live time" plus the above adjustment. Therefore, the clock reading is equal to the desired timecode 72 at which to start rendering the advertisements 50 at real-time speed (block 78). The clock reading is typically adjusted, as described above, as soon as the advertisements 50 commence being rendered. The advertisements 50 are allowed to be fast-forwarded as long as the currently playing timecode 52 of the advertisements 50 is not greater than the adjusted clock reading.

If the clock 34 is adjusted as described above, once the desired timecode 72 is reached, frames of the advertisements 50 are presented according to the adjusted clock reading so that the advertisements 50 are rendered for display/output at real-time speed (block 78) and that the end of the advertisements 50 coincides with the commercial break timeslot 58 and the return to live (block 70) is on time for the programming content 56 after the commercial break timeslot 58. Therefore, the rendering module 40 is operative to start rendering the recorded media stream 48 for display/output at real-time speed from the desired timecode 72.

Alternatively, once the advertisements 50 are being rendered at real-time speed, the clock 34 could be driven by the timecodes 52 (typically PTSs) of the advertisements 50 without input from the timecodes 62 (typically PCRs).

It is seen that the desired timecode 72 may be calculated by a calculation element comprising the calculation module 38 as described above, or by a calculation element comprising the calculation module 38 in conjunction with another element such as the clock 34 also described above, by way of example only.

Persons skilled in the art will appreciate that, throughout the present application, an MPEG-type media stream is used by way of example only, and that the present invention is not limited to a particular type of media stream, but rather includes any suitable media stream.

Persons skilled in the art will appreciate that, throughout the present application, presentation time stamps (PTSs) and program clock references (PCRs) are described by way of example only, and that the present invention is not limited to a particular type of timecode, but rather includes any suitable timecode, for example, but not limited to, using SMPTE 312 timecodes instead of the PTSs and any timecode denoting "live time" instead of the PCRs.

Persons skilled in the art will appreciate that, throughout the present application, a review buffer is used by way of example only, and that the present invention is not limited to a particular type of content storage device, but rather includes any media storage device.

Persons skilled in the art will appreciate that, throughout the present application, replacing/substituting one or more live advertisements scheduled for a commercial break time slot with one or more replacement/substitute advertisements is used by way of example only. Persons skilled in the art will appreciate the embodiments of the present invention also include replacing one or more live substitutable content items scheduled for a timeslot with one or more insertion content items. An "insertion content item", as used in the specification and claims, is defined herein to include a content item (audio and/or video) which is available for rendering during any suitable timeslot.

It is appreciated that software components of the present invention may, if desired, be implemented in ROM (read only memory) form. The software components may, generally, be implemented in hardware, if desired, using conventional techniques. It is further appreciated that the software components may be instantiated, for example, as a computer program product, on a tangible medium, or as a signal interpretable by an appropriate computer.

It will be appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

It will be appreciated by persons skilled in the art that the present invention is not limited by what has been particularly shown and described hereinabove. Rather the scope of the invention is defined by the appended s and equivalents thereof.

What is claimed is:

1. An end-user rendering device comprising a plurality of operationally connected modules, including:
    a first receiving module to receive a media stream from a first content server, the media stream including a first insertion content item and a plurality of first timecodes interspersed with the first insertion content item;
    a recording module to record the media stream in a storage device;
    a second receiving module to receive a live media stream from a second content server, the live media stream including a first channel of programming content having a timeslot and a plurality of second timecodes and third timecodes, the second and third timecodes being interspersed with the programming content and the timeslot, the timeslot being scheduled for a time after the first insertion content item has already been recorded in the storage device;
    a clock to provide a clock reading, the clock being operative to receive at least some of the third timecodes, the clock reading being updated based on the at least some third timecodes;
    a retrieving module to retrieve the recorded media stream from the storage device so that the first insertion content item can be at least partially rendered during at least part of the time allotted for the timeslot;
    a calculation element to calculate a desired timecode of the first timecodes from which to start rendering the first insertion content item of the recorded media stream for output at real-time speed based on: a first timecode of the first timecodes; a second timecode of the second timecodes; and a live time, the live time being a most recent timecode of the third timecodes used to update the clock or the clock reading at the time of the calculation, the desired timecode being after the start of the first insertion content item in the recorded media stream; and
    a rendering module to start rendering the recorded media stream for output at real-time speed from the desired timecode.

2. The device according to claim 1, wherein the calculation element is operative to calculate the desired timecode such that, if the recorded media stream is rendered for output at real-time speed from the desired timecode, the end of the first insertion content item is viewed as coinciding with the end of the timeslot.

3. The device according to claim 1, wherein:
    the live media stream also includes at least one live substitutable content item for rendering during the timeslot;
    the first insertion content item of the recorded media stream being a replacement content item for rendering instead of at least part of the at least one live substitutable content item; and
    the calculation element is operative to calculate the desired timecode such that, if the recorded media stream is rendered for output at real-time speed from the desired timecode, the at least one live substitutable content item is not outputted after the end of the replacement content item.

4. The device according to claim 1, wherein the live substitutable content item is a live advertisement.

5. The device according to claim 1, wherein:
    the first and second timecodes are presentation time stamps; and
    the third timecodes are program clock references.

6. The device according to claim 1, wherein:
    the first timecode is a timecode at the start of the first insertion content item in the recorded media stream; and
    the second timecode is a timecode at the start of the timeslot in the live media stream.

7. The device according to claim 1, wherein the calculation element is operative to calculate the desired timecode such that the calculation is based on the first timecode less the second timecode plus live time, the calculation being performed with all the inputs being adjusted to a same unit of time.

8. The device according to claim 1, wherein the calculation element is operative to calculate the desired timecode such that the desired timecode is equal to:
    the first timecode being a timecode at the start of the first insertion content item in the recorded media stream; less
    the second timecode being a timecode at the start of the timeslot in the live media stream; plus
    the live time, the calculation being performed with all the inputs being adjusted to a same unit of time.

9. The device according to any of claim 1, wherein: the recorded media steam includes at least one additional insertion content item prior to the first insertion content item, the at least one additional insertion content item being available for rendering in the timeslot with, and prior to, the first insertion content item, the at least one additional insertion content item having a duration; and the calculation element is operative to calculate the desired timecode such that the desired timecode is equal to:
    the first timecode being a timecode at the start of the first insertion content item in the recorded media stream; less the second timecode being a timecode at the start of the timeslot in the live media stream; less the duration of the at least one additional insertion content item; plus the live time, the calculation being performed with all the inputs being adjusted to a same unit of time.

10. The device according to claim 9, wherein the at least one additional insertion content item is an at least one advertisement.

11. The device according to claim 1, wherein selecting to view the first channel in the middle of the timeslot triggers the calculation element to calculate the desired timecode in the recorded media stream from which to start rendering the recorded media stream for output at real-time speed.

12. The device according to claim 1, wherein:
the modules include another storage device for recording the live media stream;
the rendering module being operative to render at least part of the live media stream recorded in the other storage device for output;
after rendering from the storage device, the rendering module is operative to render at least part of the first insertion content item faster than real-time speed; and
the calculation element is operative to calculate the desired timecode in the media stream from which to stop rendering the recorded media stream at faster than real-time speed and start rendering the recorded media stream for output at real-time speed.

13. The device according to claim 1, wherein:
the timeslot is a commercial break timeslot; and
the first insertion content item is a first advertisement.

14. A method including:
receiving a media stream from a first content server, the media stream including a first insertion content item and a plurality of first timecodes interspersed with the first insertion content item;
recording the media stream in a storage device;
receiving a live media stream from a second content server, the live media stream including a first channel of programming content having a timeslot and a plurality of second and third timecodes, the second and third timecodes being interspersed with the programming content and the timeslot, the timeslot being scheduled for a time after the first insertion content item has already been recorded in the storage device;
updating a clock based on the at least some third timecodes;
retrieving the recorded media stream from the storage device so that the first insertion content item can be at least partially rendered during at least part of the time allotted for the timeslot;
calculating a desired timecode of the first timecodes from which to start rendering the first insertion content item of the recorded media stream for output at real-time speed based on: a first timecode of the first timecodes; a second timecode of the second timecodes; and a live time, the live time being a most recent timecode of the third timecodes used to update the clock or the clock reading at the time of the calculation, the desired timecode being after the start of the first insertion content item in the recorded media stream; and
rendering the recorded media stream for output at real-time speed from the desired timecode.

15. The device according to claim 1, wherein:
the first timecode is a timecode at the end of the first insertion content item in the recorded media stream; and
the second timecode is a timecode at the end of the timeslot in the live media stream.

16. The device according to claim 1, wherein the calculation element is operative to calculate the desired timecode such that the desired timecode is equal to:
the first timecode being a timecode at the end of the first insertion content item in the recorded media stream; less
the second timecode being a timecode at the end of the timeslot in the live media stream; plus
the live time, the calculation being performed with all the inputs being adjusted to a same unit of time.

* * * * *